July 11, 1944.    F. M. REID    2,353,267
FIFTH WHEEL CONSTRUCTION
Filed May 14, 1943    3 Sheets-Sheet 1
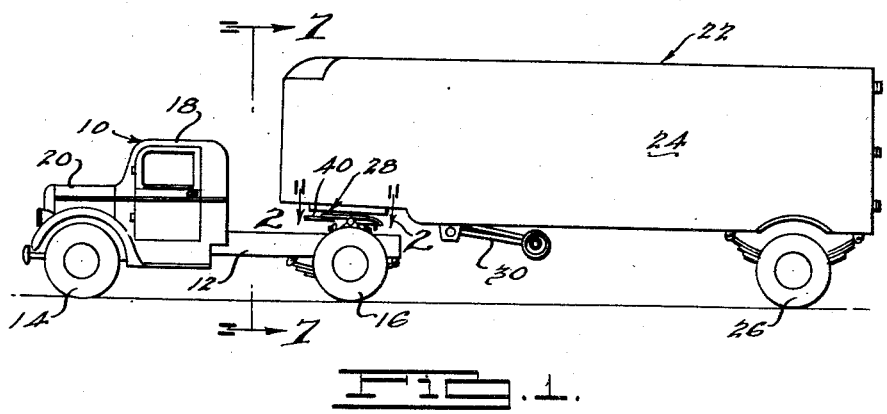
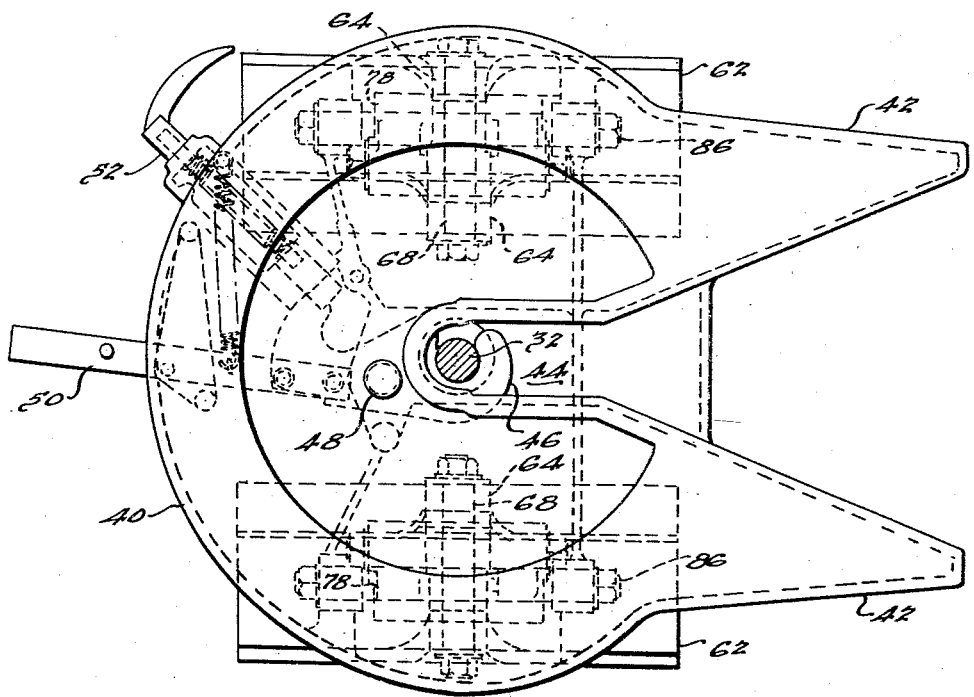
INVENTOR.
Frederick M. Reid.
BY
Harness, Dickey & Pierce.

July 11, 1944.   F. M. REID   2,353,267
FIFTH WHEEL CONSTRUCTION
Filed May 14, 1943   3 Sheets-Sheet 2
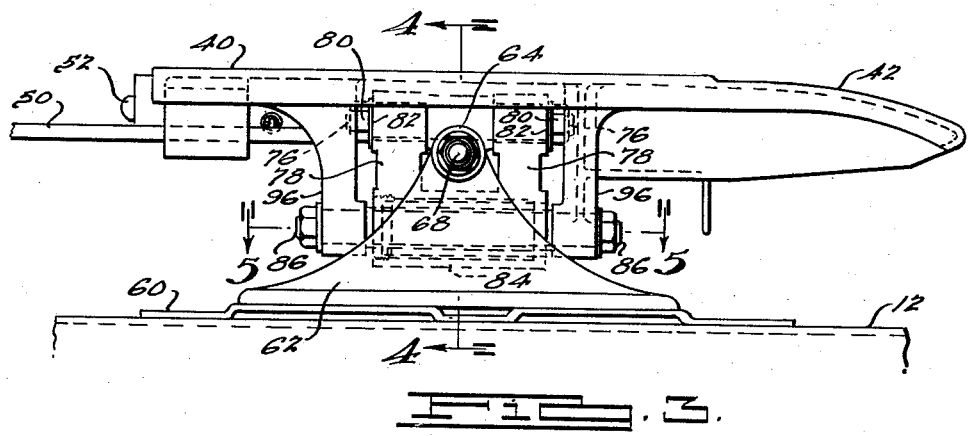
FIG. 3.
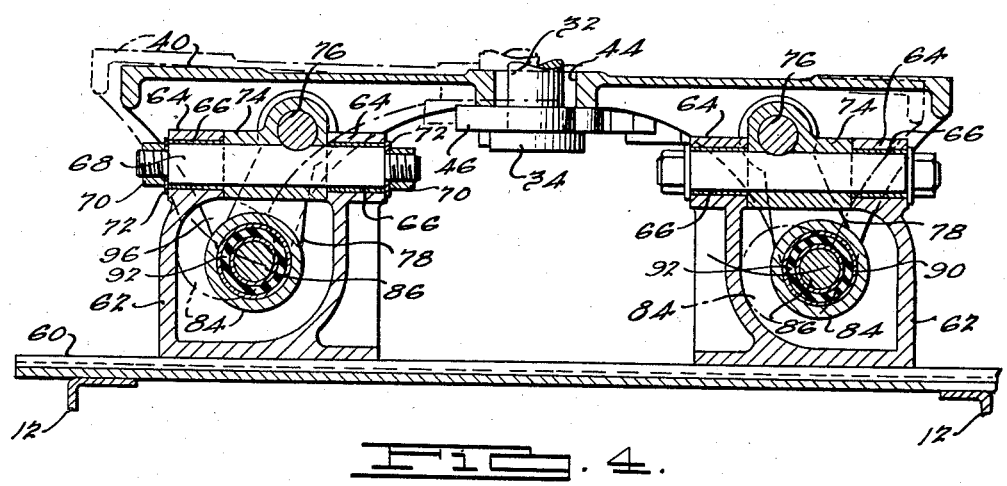
FIG. 4.
FIG. 5.
INVENTOR.
Frederick M. Reid.
BY
Harness, Dickey & Pierce.

July 11, 1944.   F. M. REID   2,353,267
FIFTH WHEEL CONSTRUCTION
Filed May 14, 1943   3 Sheets-Sheet 3
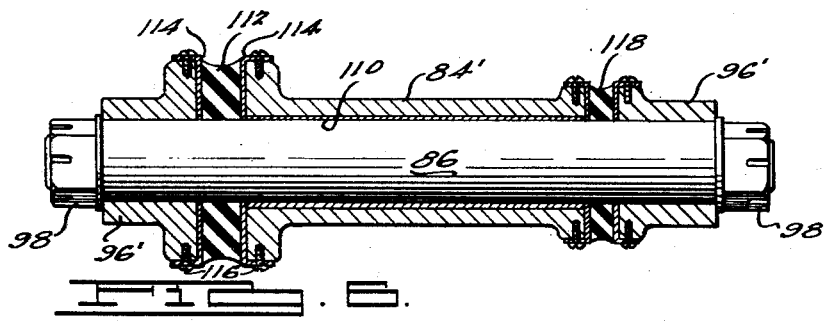
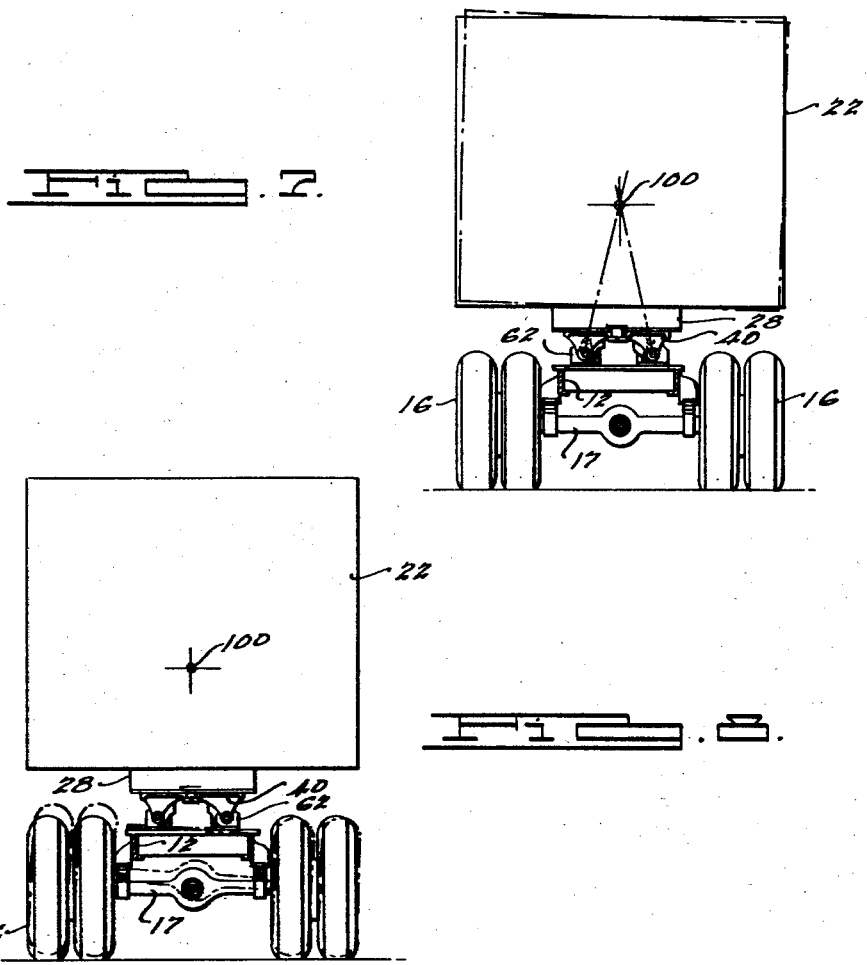
INVENTOR.
Frederick M. Reid.
BY
Harness, Dickey & Pierce.

Patented July 11, 1944

2,353,267

UNITED STATES PATENT OFFICE 2,353,267

FIFTH WHEEL CONSTRUCTION

Frederick M. Reid, Detroit, Mich., assignor to Fruehauf Trailer Company, Detroit, Mich., a corporation of Michigan Application May 14, 1943, Serial No. 487,001

24 Claims. (Cl. 280—33.1)

This invention relates to fifth wheel constructions and to a tractor semi-trailer combination connected thereby, the principal object being the provision of a new and novel fifth wheel structure embodying material advantages over similar structures heretofore provided.

Objects of the invention include the provision of a fifth wheel structure for use in connecting a tractor to a semi-trailer so constructed and arranged as to cushion lateral impact forces occurring in the connection between the tractor and the trailer; the provision of a fifth wheel structure for connecting a tractor and semi-trailer which will result in a minimum displacement of the center of gravity of the trailer and its load in response to lateral impact or other forces exerted between the tractor and/or trailer; the provision of a fifth wheel structure for connecting a tractor to a semi-trailer permitting angular mis-alignment of the cooperating fifth wheel surfaces transversely of the vehicles without subjecting the vehicles or the fifth wheel structure to increased stresses; and the provision of a fifth wheel structure for connecting a tractor to a semi-trailer which will materially reduce the torsional stresses in the trailer body as compared to those set up therein when employing fifth wheel constructions of conventional types.

Further objects of the invention include the provision of a fifth wheel structure for connecting a tractor to a semi-trailer in which the weight of the trailer on the fifth wheel structure is supported through tension in part of the fifth wheel structure; the provision of a fifth wheel structure of the type described in which the weight of the trailer applied to the tractor is suspended through members capable of swinging movement in a plane disposed transversely of the length of the tractor; the provision of a fifth wheel structure of the class described in which the weight of the trailer transmitted through the tractor is carried as tension in laterally swingable suspension members; the provision of a fifth wheel structure of the type described in which the weight of the trailer applied to the tractor is transmitted through arms or links swingable in planes transverse to the length of the tractor, the weight of the trailer being transmitted to the tractor in an upward direction through such arms or links; the provision of a fifth wheel structure as above described in which the arms or links are so inclined that their center lines converge toward one another in an upward direction; the provision of a fifth wheel structure as above described in which the center lines of the arms or links when extended normally intersect at a distance above the ground approximately equal to the distance which the center of gravity of the trailer when normally loaded is located above the ground; the provision of a fifth wheel structure as above described in which the swingable arms or links are provided with non-metallic cushioning elements; the provision of a fifth wheel structure as above described in which such cushioning elements are so constructed and arranged as to exert torsional resistance to swinging movement of the arms or links; and the provision of a fifth wheel structure as above described in which the non-metallic cushioning elements are arranged to absorb shocks transmitted therethrough both in a direction longitudinally of the trailer and vertically with respect thereto.

A further object of the invention includes the provision of a tractor semi-trailer combination embodying a fifth wheel structure as above described.

The above being among the objects of the present invention the same consists in certain new and novel details of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a side elevational view of a tractor semi-trailer combination connected together by a fifth wheel structure embodying the principles of the present invention;

Fig. 2 is an enlarged plan view of the fifth wheel structure carried by the tractor shown in Fig. 1, the same constituting a horizontal sectional view taken on the line 2—2 of Fig. 1;

Fig. 3 is a side elevational view of the fifth wheel structure shown in Fig. 2 and illustrating a portion of the tractor frame in conjunction therewith;

Fig. 4 is a slightly enlarged transverse, vertical sectional view taken on the line 4—4 of Fig. 3;

Fig. 5 is an enlarged horizontal sectional view taken axially through one of the pivotal connections of the fifth wheel structure shown in the preceding views as on the line 5—5 of Fig. 3;

Fig. 6 is a view similar to Fig. 5 but illustrating a modified form of construction;

Fig. 7 is a vertical sectional view taken transversely of the tractor-trailer combination shown in Fig. 1 as on the line 7—7 and illustrating the manner in which the body of the trailer may move laterally without necessitating an equivalent movement of the tractor; and Fig. 8 is a view similar to Fig. 7 but illustrating the manner in which the rear end of the tractor may move laterally without requiring a corresponding lateral movement of the body of the trailer.

Fifth wheels of the type conventionally employed for releasably connecting a tractor to a semi-trailer usually comprise a relatively large plate-like member or platform having a centrally located V-shaped groove or recess in its rear edge extending to approximately the center thereof at which point is located a catch for releasably engaging a kingpin carried by the trailer and adapted to be received therein. The plate-like member or platform is conventionally mounted for pivotal or tipping movement about a horizontal axis disposed transversely of the tractor vehicle and carried in bearing blocks or the like fixed with respect to the tractor frame. The pivoting of the platform is provided to enhance the ease of coupling the tractor and semi-trailer together regardless of variation in height between their cooperating ends and also to provide an articulated connection to compensate for variations in road height of the location of the front and rear wheels of the tractor and the rear wheels provided under the trailer.

It has heretofore been proposed to so construct and arrange such fifth wheel structures as to permit relative movement of the platform or platelike member longitudinally of the tractor against the resistance of springs or the like so as to cushion the load between the tractor and trailer when the combination is started or stopped, or for other reasons.

I have discovered that there are forces exerted through the connection between the tractor and semi-trailer which have destructive effects on both the tractor and semi-trailer, as well as the fifth wheel structure, and which no attempt has been made heretofore to cushion or otherwise minimize. These forces are those forces which act laterally of the fifth wheel structure, that is, in a direction crosswise of the vehicle. These forces may be impact forces acting transversely of the vehicles and my occur, for instance, where the wheels of either the tractor or the trailer strike a curb, where the tractor and trailer are at an angle with respect to each other when coupled together, when one side of either the tractor or trailer strikes a bump or other elevated road surface tending to rotate the tractor or trailer about the line of connection of the wheels on the opposite side of the vehicle with the ground, due to centrifugal forces in the tractor and trailer in making a turn particularly at higher speeds, and from innumberable other reasons. It is, of course, appreciated that semi-trailers are conventionally employed to carry the heaviest types of loads and that where any condition such as above described arises which tends to displace the tractor or the trailer laterally with respect to the other the force of such tendency is resisted through the fifth wheel structure connecting them, and due to the relatively great inertia particularly of the trailer when heavily loaded these forces reach unusually high values. Moreover these forces are invariably transmitted to the trailer body, and frame where employed, as either torsional or bending forces which when uncushioned as in conventional fifth wheel structures tends to foster early deterioration of the trailer body in particular, as well as other parts subjected to such stresses.

It is the principal object of the present invention to provide a fifth wheel structure which will permit relative movement between the tractor and the trailer at the fifth wheel in a direction transversely of the length of the trailer and tractor, thereby tending to minimize such lateral forces acting or tending to act through the fifth wheel structure. The invention further provides a fifth wheel structure so constructed and arranged that in permitting such lateral movement between the connected ends of the trailer and tractor the force occasioning such movement is cushioned in its transmission between the trailer and the tractor. The invention further contemplates a fifth wheel structure so constructed and arranged that relative lateral movement between different parts of the fifth wheel structure connecting the tractor and the trailer will produce substantially no movement, or else will minimize the movement of the center of gravity of the trailer and its load in a lateral direction.

It will be appreciated by those skilled in the art that in carrying out the present invention the kingpin may be secured to the trailer and the remainder of the fifth wheel structure to the tractor in accordance with present day conventional practices, or that the positioning of these parts may be reversed, that is the kingpin may be carried by the tractor and the remaining part of the fifth wheel structure by the trailer as was suggested at an earlier period in the art, and still obtain the benefits of the present invention in either case. The present day practice of providing the kingpin on the trailer is believed preferable, however, and for that reason in the accompanying drawings this type of construction is shown by way of illustration and reference hereinafter in both the specification and claims will be limited to this type of construction, those being skilled in the art being taught thereby and being capable of readily understanding the manner in which the construction may be reversed if it is desired to employ the kingpin on the tractor and the claims being interpreted with this in mind.

Referring now to the accompanying drawings and particularly to Fig. 1, a conventional motor vehicle of the tractor type is illustrated generally at 10 as including a frame 12 supported at its forward end by steerable ground wheels 14, at its rear end by dual wheels 16 mounted upon a driving axle 17 (shown in Figs. 7 and 8), all of which are connected to the frame 12 in accordance with conventional practice. The frame 12 carries a conventional cab 18 and hood 20 under the latter of which a conventional internal combustion power plant is located and drivingly connected to the rear wheel 16 through the axle 17 in accordance with conventional practice.

A semi-trailer is indicated generally at 22 as comprising a conventional type of body 24 conventionally supported at its rear end by wheels 26 and at its forward end on the rear end of the tractor 10 through a fifth wheel structure indicated generally at 28. Conventional folding legs 30 may be provided under the forward end of the trailer 22 for the purpose of permitting the forward end of the trailer to be supported in normal elevated position when the tractor 10 is uncoupled and withdrawn therefrom.

As in conventional constructions the fifth wheel portion 28 of the trailer 22 comprises a member having a plain lower face rigid with the trailer and centrally of which is fixed a downwardly extending kingpin 32, brought out in Figs. 2 and 3, the lower end of which is provided with an enlarged head 34 in accordance with conventional practice.

The rear end of the tractor 10 has fixed thereto what is commonly termed in the trade as a fifth wheel and this includes, as in conventional constructions an approximately circular plate-like member or platform 40 having a flat upper surface and a pair of rearwardly extending laterally spaced extensions 42, the rear ends of the latter curving downwardly as brought out in Fig. 3. As brought out in Fig. 2 the space between the extensions 42 forms a forwardly converging V-like slot which merges into a relatively narrow slot 44 centrally of the plate 40 and within which the kingpin 32 is releasably secured when the tractor and trailer are hooked together. In order to releasably retain the kingpin 32 in the slot 44 a hook member 46 is pivotally mounted on the under-face of the plate 50 by means of a vertical pin 48 and is provided with an extending handle portion 50 by means of which it may be operated. A conventional type of spring pressed catch 52 is associated with the hook member 46 for releasably locking it in operative position. As indicated in Fig. 4 the hook 46 engages the kingpin 32 above the head 34 thereof so as not only to prevent displacement of the kingpin 32 rearwardly of the slot 44 but also to prevent the kingpin 32 from being inadvertently withdrawn vertically out of the slot 44. It will be appreciated that the wide V-slot formed between the extensions 42 is for the purpose of engaging the kingpin 32 when the tractor 10 is backed into the trailer 22 and to guide the kingpin 32 into the narrow portion 44 of the slot. This portion of the construction is, as above explained, conventional, and if a more detailed description of the same is desired reference may be had to the equivalent portion of the structure shown and described in my United States Letters Patent No. 1,925,279, issued September 5, 1933, on Tractor semi-trailer fifth wheel structure.

In conventional fifth wheel structures of this general type the equivalent of the plate member 40 is mounted on the rear end of the tractor for pivotal movement about a horizontal line extending transversely of the tractor and, except for a yieldable mounting of the brackets for such pivotal connection, as by means of the rubber blocks shown in my prior United States patent above identified, or by other means heretofore suggested for permitting bodily shiftable movement of the equivalent of the plate member 40 in a forward and rearward direction, this has been the extent of movements of the equivalent of the plate 40 heretofore suggested. The present invention likewise provides means for pivotally mounting the plate member 40 for movement about a horizontal axis extending transversely of the tractor as in the prior art and to employ rubber in the connections to cushion shocks exerted longitudinally of the tractor, but in addition provides means whereby the plate member 40 may shift laterally with respect to the tractor in order to enable the desirable attributes of the present invention to be realized.

The last described lateral movements of the plate member 40 may, in the broader aspects of the invention, obviously be realized by various forms of construction but I have found it desirable in providing for such lateral movements of the plate member 40 to obtain it in such a manner that the weight of the trailer acting upon it is suspended, preferably through the use of links under tension, as in such case the structure is of a simplified nature and results in certain inherent advantages not readily capable in other types of construction. This preferred type of construction is, therefore, shown in the drawings by way of illustration.

As shown in the drawings and as best brought out in Figs. 3 and 4 a relatively rigid plate member 60 is extended across and rigidly secured to the opposite side members of the tractor frame 10 adjacent the rear end thereof. Rigidly fixed to the upper face of the plate 60 by any suitable means such as welding, riveting, or the like are a pair of supporting brackets indicated generally at 62 which are spaced from each other and are aligned with each other transversely of the tractor 10. Each bracket 62 is provided at its upper end with a pair of axially spaced bearing bosses 64 in each of which is received a bearing bushing 66. The bearing bushings 66 of each bracket 62 are axially aligned with each other and with the bearing bushing 66 of the remaining bracket 62. A pin 68 is rotatably received within the bearing bushing 66 of each bracket 62 and each pin 68 is provided with threaded end portions upon which nuts 70 and washers 72 are received, the latter abutting against the outer faces of the corresponding bosses 64 to maintain the pin 68 against the axial movement.

Received on the pin 68 of each bracket 62 between the bearing bosses 64 thereof and of substantially the same length axially of the pin 68 as the distance between the bearing bosses 64 so as to prevent relative movement thereof between the bearing bosses 64, is a bracket 74. Each bracket 74 is, therefore, mounted on its corresponding pin 68 for rotation about a horizontal axis extending transversely of the tractor 10. Each bracket 74 supports therein a pin 76 arranged with its axis perpendicular to the axis of such pin 68 and above the same. In the particular construction shown and as brought out in Fig. 4 the pin 76 partially intersects the corresponding pin 68 but this is merely a matter of choice, the pin 76 in such case serving to lock the corresponding pin 68 against axial movement in the corresponding bracket 62.

As best brought out in Fig. 3 the pins 76 project forwardly and rearwardly beyond their corresponding brackets 74 and rotatably received upon each projecting end is the upper end of a link or arm 78 held against axial outward displacement thereon by means of a nut 80 and washer 82. The lower ends of the arms 78 which are rotatably mounted on the opposite ends of each pin 76 are integrally connected together by a sleeve-like portion 84. The sleeve-like portion 84 projects through the corresponding bracket 62, as brought out in Fig. 4, the opposite side walls of the bracket being spaced from one another a sufficient distance to permit a material amount of movement of the portion 84, at least sufficient to permit the benefits of the present invention to be realized, between them about the axis of its corresponding pin 76. Contact between the side walls of the bracket 62 and the portion 84 serves, in the case shown, as a means for positively preventing undesirably excessive lateral movements of the member 40 as will hereinafter be more apparent. The sleeve-like portion 84 is internally bored in parallelism with the axis of the corresponding pin 76 and in turn rotatably or oscillatably receives therein a pin 86 which projects outwardly beyond each end thereof, the latter pins being arranged in axially parallel relation with respect to the pins 76.

In the broader aspects of the invention each pin 86 may be supported for rotation or oscillation in the corresponding sleeve portion 84 in any suitable manner, such as by plain bearings or the like. However, in accordance with a more limited phase of the present invention the connection between each pin 86 and its corresponding sleeve 84 is such as to resiliently resist relative rotation between each pin 86 and its corresponding sleeve 84 and such as to constantly urge these two parts toward a predetermined angular relationship with respect to each other.

In the particular type of construction illustrated in Fig. 5 for obtaining the last mentioned results it will be noted that the pin 86 and the sleeve 84 are radially spaced from one another and interposed between them is a bushing comprising a relatively thin inner metallic sleeve 88 non-rotatably embracing the pin 86, a similar sleeve 90 non-rotatably received within the bore of the sleeve 84, and an intervening sleeve of rubber or rubber-like material 92 which is preferably bonded to both of the sleeves 88 and 90. The outer sleeve 90 of this bushing is of shorter length than the length of the corresponding sleeve 84 and one end is abutted against a shoulder 94 formed at one end of the bore of the sleeve 84, the sleeve 90 being maintained in such position by means of a nut 96 threaded internally into the opposite end of the bore of the sleeve 84. The fit of the sleeve 90 in the bore of the sleeve 84 and the axial binding effect produced upon it by the nut 96 are ordinarily sufficient to prevent any relative rotation of the sleeve 90 in the sleeve 84 but additional means may be provided for this purpose if necessary.

The sleeve 88 is of greater length than the sleeve 84 and projects equal distances outwardly beyond the opposite ends of the sleeve 84. The pin 86 is preferably of such size and is pressed into the sleeve 88 with sufficient force to prevent the possibility of relative rotation between them in operation, but additional means may be provided to prevent such rotation if desired.

The plate member 40 has fixed thereto and preferably integrally formed therewith four downwardly extending arms 96 arranged in longitudinally spaced pairs on each side of the plate member 40. The arms 96 of each such pair of arms are bored out for reception of the opposite ends of the pin 86 on the corresponding side of the structure and are longitudinally spaced from one another by a distance such that the sleeve 88 in the corresponding sleeve 84 on the same side of the structure is relatively closely received therebetween. In assembling, the sleeve 84 with the bushings 88, 90, and 92 assembled therein is inserted between the arms 96 on the same side of the structure and the pin 86 is pressed into place, nuts 98 threaded on opposite ends of the pin 86 outwardly of the corresponding arms 96 serving to maintain the pin 86 in position and may also serve to spring the corresponding arms 96 a slight amount so as to clamp the corresponding sleeve 88 axially between in at least some instances.

From the above description it will be appreciated that the weight of the trailer 22 is transmitted to the plate member 40 and from the plate member 40 to the lower ends of the arms 78, thence upwardly through the arms 78 to the pins 76, through the pins 76 and brackets 74 to the pins 68, and thence to the frame of the tractor 10 through the brackets 62 fixed with respect thereto. This weight of the trailer 22 carried by the tractor 10 is thus carried in suspension through the arms 78 and because of the fact that this weight is applied to the lower ends of the arms 78 these lower ends of the arms 78 will always tend to swing to their lowermost positions in the absence of lateral forces preventing such movement.

The plate member 40 is thus supported for movement transversely of the length of the tractor through swinging of the arms 78 about the axes of the pins 76 within the limits of movement of the sleeve-like portions between the opposite walls of the brackets 62, as indicated by dotted lines in Fig. 4, and because the pins 76 are carried by the brackets 74 which are pivotal about the axes of the pins 68, the plate member 40 may tip about the axes of the pins 68 to provide the same type of movement in this direction that is provided in conventional constructions and for the same purposes. Where, as in the particular case illustrated, a resilient connection is provided between the arms 78 and the pin 86, in the particular case shown through the rubber sleeves 92, it will be appreciated that the rubber sleeves when assembled will preferably be so positioned that there will be no torsional stress set up in it when the fifth wheel structure is in its normal position such as illustrated in Fig. 4. If, however, some force exerted between the tractor 10 and trailer 22 tends to move one laterally with respect to the other, such lateral force acting through the arms 78 will cause the plate member 40 to shift laterally from its neutral central position illustrated in Fig. 4, accompanied by simultaneous swinging of the arms 78 with respect to the pins 86, the rubber bushings 92 thus being placed under torsion tending to return the arms 78 to their neutral position. The bushings 92 thus tend to cushion such movement and tend to return the plate member 40 to its neutral position regardless of and in addition to the force of gravity acting through the plate 40 on the lower ends of the arms 78 and also tending to return the plate 40 to its neutral position. The sleeves 92 further provide resilient members in the connection between the plate 40 and the frame of the tractor capable of yielding longitudinally to cushion longitudinal shocks transmitted between the trailer and tractor.

The mounting of the plate member 40 in such a manner as to permit it to shift laterally in response to forces acting laterally between the trailer and tractor is the broad feature of the present invention and is important for the following reasons. In conventional constructions where some condition arises which tends to move the connected ends of the trailer and tractor relative to one another these connected ends must actually move laterally simultaneously with each other in response to such force. This force must be resisted in its entirety by the fifth wheel structure and necessarily subjects both the tractor and the trailer to the effects of these forces. Because of the fact that the trailer may be heavily loaded and present a relatively great amount of inertia resisting any movement of its forward end under the effects of such forces, the trailer structure itself is subjected to high torsional and bending stresses over its length under such conditions and the frame of the tractor and its rear wheel suspension is likewise subjected to major stresses.

These forces which tend to move the connected ends of the tractor and trailer laterally with respect to each other may arise from any one or more of a number of different conditions. For instance, where the tractor-trailer combination is rounding a curve at relatively high speed the centrifugal force exerted on the trailer on its load tends to move the forward end of the trailer radially outwardly of the curve with respect to the rear end of the tractor. These forces also occur where the trailer and tractor are coupled while their longitudinal center lines are at an angle to each other. They may also arise where the wheels on one side of the tractor or trailer strike an obstruction in the road tending to lift the corresponding side thereof as in such case it tends to shift the point of connection between the tractor and trailer laterally of the position which it assumes when in level condition. One condition which results in extremely high stresses acting laterally of the fifth wheel occurs when the rear wheel of the tractor in particular strikes a curb at a material angle thereto and which tends to throw the rear end of the tractor outwardly away from the curb, the resistance to the movement of the forward end of the trailer under such conditions because of its relatively great inertia setting up forces which are extremely destructive in conventional types of fifth wheel structures.

It will be appreciated that under the above described conditions which set up destructive lateral forces in conventional fifth wheel structures, where such conditions occur with the fifth wheel constructed in accordance with the present invention the forward end of the trailer may move laterally with respect to the rear end of the tractor, or vice versa, so as to cushion these forces and reduce their intensity to a small proportion of that which would result in conventional constructions. It, therefore, provides a construction materally reducing the stresses to which the tractor and trailer would otherwise be subjected to under such conditions and serves to materially lengthen the life of both for this reason.

Up to this point no specific mention has been made of the relative position of the arms 78 on opposite sides of the fifth wheel structure except to note that they extend in a relatively vertical position. It will be appreciated that they may extend in a substantially exactly vertical neutral position and permit the major advantages of the present invention to be realized. However, I have found that if these arms are arranged in upwardly and inwardly inclined relation with respect to each other when in neutral position certain additional advantages are capable of being realized, and if the inclination is of a predetermined nature still further advantages are obtained. If, as illustrated in Fig. 7, the arms 78 are so inclined upwardly and inwardly with respect to each other when in their neutral position that their center lines intersect on a line extending longitudinally of the trailer 22 and intersecting the center of gravity thereof, illustrated in Figs. 7 and 8 at 100, then it will be appreciated that the plate member 40 may move laterally from its neutral position in either direction without bodily displacing the corresponding end of the trailer a corresponding amount. The trailer body and the plate 40 in such case tends to rotate about such longitudinal line passing through the center of gravity 100 instead of shifting laterally and the forces required to thus rotate the body of the trailer and its load and the inertia of these parts resisting such force are only a fraction of that which would otherwise be required to bodily shift the corresponding end of the trailer and its load under such conditions.

Furthermore with this last described arrangement and as brought out in Fig. 7, if the tractor-trailer combination is rounding a curve, the centrifugal force exerted between the trailer and tractor through the fifth wheel structure in this case will tend and will actually cause the plate 40 to shift outwardly of the curve. This outward shifting of the plate member 40 with the arms 78 inclined as illustrated in Fig. 4, will lower the side of the plate member 40 on the inside of the curve and will raise that side thereof on the outside of the curve, thus tipping the body 22 of the trailer in a direction to properly bank it for making the turn.

Another condition is illustrated in Fig. 8 which sets up severe strains in the fifth wheel structure and in the body of the trailer when conventional fifth wheel structures are employed and which stresses are substantially entirely eliminated by a fifth wheel structure constructed in accordance with the present invention. This is the case where the rear wheels 16 of the tractor 10 on one side of the tractor strike an obstruction or bump in a road surface tending to lift the wheel or wheels on the one side of the tractor without correspondingly lifting them on the other side of the tractor. In Fig. 8 the wheels 16 are shown in full lines on a level roadway and in dotted lines in the position which they assume when the wheels on one side hit such obstruction. It will be noted that when such an obstruction is hit by the wheels on the one side only, the rear end of the tractor tends to pivot about the general line of contact of the wheel or wheels on the opposite side of the tractor and the ground and move the fifth wheel structure carried by it to the right as viewed in Fig. 8. Under such conditions if a conventional fifth wheel structure was employed such movement of the rear end of the tractor to the right as viewed in Fig. 8 would necessitate an equivalent movement of the front end of the trailer 22 in the same direction and, because of the resistance of the front end of the trailer to movement in this direction because of its relatively great inertia, stresses would necessarily be set up in the fifth wheel connection between the tractor and trailer and in the body of the trailer itself. It may also be noted that with conventional fifth wheel structures under such conditions the front end of the trailer body 22 will be tipped equally with the rear end of the tractor, thus setting up torsional stresses in the body 22 of the trailer. Such forces, of course, vary in accordance with the degree of tipping which thus cause them, but it is a fact that these forces are relatively great when conventional fifth wheel structures are employed and are a material contributing factor to early destruction of the trailer body 22.

Under the same conditions as above described where the fifth wheel structure of the present invention is employed, this tipping movement of the rear end of the tractor is accompanied by lateral shifting movement of the plate member 40 in response to the lateral force thus applied to fifth wheel structures, the plate 40 tending to remain stationary, thus eliminating the necessity of simultaneous shifting of the forward end of the trailer and materially relieving the application of such force to the trailer body. The plate member 40 under such conditions will tip, where the arms 78 are inclined as illustrated, in a direction to offset the tendency toward equal tipping of the body 22 of the trailer, thus having a favorable result under such conditions to prevent setting up torsional stresses in the trailer body.

From the foregoing it will be appreciated that by the provision of the fifth wheel structure constructed in accordance with the principles of the present invention a superior connection is provided between the tractor and the trailer relieving to a great extent, or at least materially minimizing, the stresses to which they would otherwise be subjected by the use of a conventional fifth wheel structure as a result of forces transmitted through them in a direction transversely of the length of the tractor.

In Fig. 6 a modified form of torsionally resilient connection between the pins 86 and the arms equivalent to the arms 78 above described is shown. In this modified form of construction the weight of the trailer is transmitted from the suspension arms 78 to the pins 86 through metal to metal contact and not through a non-metallic sleeve such as is brought out in detail in Fig. 5, but at the same time rubber or rubber-like material is employed to resiliently resist torsional displacement of one with respect to the other and to provide for a longitudinal cushioning action. Referring to Fig. 6 the pin 86 may be identical to the pin 86 previously described and provided with the same nuts 98 at its outer end. The sleeve 84' here shown is equivalent to the sleeve 84 previously described except that in this case it is internally provided with a metallic bearing bushing 110 in which the pin 86 is rotatably received. The lower ends of the arms fixed to the plate member 40, here illustrated at 96' and equivalent to the arms 96 previously described, are radially enlarged at their inner ends as shown, the lefthand arm 96' being enlarged to greater extent than the righthand arm 96'. The corresponding ends of the sleeve 84' are complementarily radially enlarged and are located in spaced relation with respect to the corresponding arms 96' axially of the pin 96. Between the lefthand end of the sleeve 84' and the corresponding arm 96' a washer-like element comprising a relatively thick annular body 112 of rubber or rubber-like material bonded at its opposite sides to corresponding sheet metal members 114, is located in surounding relationship with respect to the pin 86. The members 114 are formed to lie in flat contacting relationship with respect to the cooperating faces of the arms 96' and sleeve 84' and their radially outer edges are outwardly flanged over the associated radial enlargement of these parts and are non-rotatably fixed thereto by means of screws 116. Between the opposite ends of the sleeve 84' and the remaining arm 96' a similar assembly, here illustrated generally at 118, but of smaller diameter than the first described, is provided and is similarly secured in place.

It will be appreciated that the construction illustrated in Fig. 6 provides substantially the same result as the construction illustrated in Fig. 5 in so far as resisting relative rotation of the sleeve 84' and pin 86 is concerned and although also allowing relative axial movement between the sleeve 84' and the pin 86 it eliminates the yielding provided by the sleeve 92 in Fig. 4 transversely of the axis of the pin 86.

Formal changes may be made in the specific embodiment of the invention described without departing from the spirit or substance of the broad invention, the scope of which is commensurate with the appended claims.

What I claim is:

1. In a structure of the class including a tractor and a semi-trailer, the combination with said tractor and semi-trailer of means for supporting the front end of the semi-trailer on the rear end of the tractor comprising supporting means fixed with respect to said tractor, means for receiving the weight of the forward end of said semi-trailer and for releasably securing said front end of said semi-trailer thereto, and means connecting the last-mentioned means to the first-mentioned means for relative movement between them transversely to the length of said trailer comprising a pair of links pivotally connected to said first and second-mentioned means, the pivotal connection between said links and each of said first and second-mentioned means being parallel and spaced from each other transversely of the length of said tractor and transmitting in tension the weight of the front end of said trailer to the first-mentioned means from the second-mentioned means therethrough.

2. In a structure of the class including a tractor and a semi-trailer, the combination with said tractor and semi-trailer of means for supporting the weight of the forward end of said semi-trailer upon the rear end of said tractor comprising a plate-like member receiving the forward end of said semi-trailer thereon and releasably secured thereto for pivotal movement about a vertical axis, and link means connecting said plate-like member and said tractor for bodily shifting movement of said plate-like member laterally of the length of and with respect to said tractor, said means being so constructed and arranged as to provide a controlled and defined amount and direction of displacement of said member relative to said tractor.

3. In a structure of the class including a tractor and a semi-trailer, the combination with said tractor and semi-trailer of means tractively connecting said tractor and semi-trailer and for transmitting the load of the forward end of the semi-trailer to the rear end of said tractor comprising a kingpin projecting downwardly from the forward end of said semi-trailer, a plate-like member having a slot therein in which said kingpin is releasably secured, pairs of arms at opposite sides of said plate members the arms of each pair of which are spaced from each other longitudinally of said tractor and rigidly fixed with respect to said plate member, links pivotally connected to the lower ends of each of said pairs of arms for movement about an axis extending longitudinally of said tractor, said arms extending upwardly from said pivotal axes thereof, and means pivotally connecting the upper ends of said arms to said tractor for movement about axes parallel to and above the first-mentioned pivotal axes.

4. In a structure of the class including a tractor and a semi-trailer, the combination with said tractor and semi-trailer of means tractively connecting said tractor and semi-trailer and for transmitting the load of the forward end of the semi-trailer to the rear end of said tractor comprising a kingpin projecting downwardly from the forward end of said semi-trailer, a plate-like member having a slot therein in which said kingpin is releasably secured, pairs of arms at opposite sides of said plate members the arms of each pair of which are spaced from each other longitudinally of said tractor and rigidly fixed with respect to said plate member, links pivotally connected to the lower ends of each of said pairs of arms for movement about an axis extending longitudinally of said tractor, said arms extending upwardly from said pivotal axes thereof, a bracket pivotally connected to the upper ends of said arms on the corresponding side of said tractor for movement about axes parallel with the first-mentioned pivotal axes, and a pivotal connection between each of said brackets and said tractor arranged with the axes thereof extending transversely with respect to the length of said tractor.

5. A tractor trailer fifth wheel construction comprising, in combination, a member adapted to receive the forward end of a trailer thereon, means adapted to be fixed with respect to the frame of a tractor, and a pair of link means connecting said member and means for relative shifting movement with respect to each other in a direction transverse to the longitudinal center line thereof, the pivotal axes of the connection between said link means and said member being parallel to and laterally spaced from one another transversely of said longitudinal center line.

6. A tractor semi-trailer fifth wheel structure comprising, in combination, a member adapted to receive the weight of the forward end of a semi-trailer thereon, means adapted to be rigidly fixed with respect to the frame of a tractor, and substantially rigid link means interconnecting said member and the first-mentioned means for relative shiftable movement between them transversely of the longitudinal center line of said member, the last-mentioned means being so constructed and arranged as to transmit the load of said trailer from said member to the first-mentioned means as tension in the last-mentioned means and control and define the amount and direction of displacement of said member relative to said means.

7. A tractor trailer fifth wheel structure comprising, in combination, a member adapted for the reception of the forward end of said trailer thereon, means securable to a tractor, and means interconnecting said member and the first-mentioned means for pivotal movement of said member relative to said first-mentioned means about a horizontal line extending transversely of the longitudinal center line of said member and for bodily shiftable movement of said member relative to said first-mentioned means in a generally horizontal direction transverse to said longitudinal center line.

8. In a tractor semi-trailer fifth wheel structure, in combination, a member adapted to receive the forward end of a semi-trailer thereon, means adapted to be fixed with respect to a tractor, and means interconnecting said member with the first-mentioned means including means forming a pivotal connection therebetween for pivotal movement of said member about a horizontally extending line transverse to the longitudinal center line of said member and means affording bodily shiftable movement of said member transversely of the longitudinal center line thereof relative to said first-mentioned means.

9. In a tractor trailer fifth wheel structure, in combination, a member adapted to receive the forward end of a trailer thereon, means adapted to be fixed with respect to a tractor, and means interconnecting said member with the first-mentioned means including means forming a pivotal connection therebetween for pivotal movement of said member about a horizontally extending line transverse to the longitudinal center line of said member and means affording bodily shiftable movement of said member transversely of the longitudinal center line thereof relative to said first-mentioned means, the last-mentioned means including links disposed on opposite sides of the longitudinal center line of said member.

10. In a tractor semi-trailer fifth wheel structure, in combination, a member adapted to receive the forward end of a semi-trailer thereon, means adapted to be fixed with respect to a tractor, and means interconnecting said member with the first-mentioned means including means forming a pivotal connection therebetween for pivotal movement of said member about a horizontally extending line transverse to the longitudinal center line of said member and means affording bodily shiftable movement of said member transversely of the longitudinal center line thereof relative to said first-mentioned means, the last-mentioned means including links transmitting the weight of said trailer from said member to said first-mentioned means through tension therein.

11. In a tractor trailer fifth wheel structure, in combination, a member adapted to receive the forward end of a trailer thereon, means adapted to be fixed with respect to a tractor, and means interconnecting said member with the first-mentioned means including means forming a pivotal connection therebetween for pivotal movement of said member about a horizontally extending line transverse to the longitudinal center line of said member and means affording bodily shiftable movement of said member transversely of the longitudinal center line thereof relative to said first-mentioned means, the last-mentioned means comprising links pivotally mounted at their opposite ends for movement about parallel axes and transmitting the load of said trailer from said member to the first-mentioned means through tension therein.

12. In a tractor semi-trailer fifth wheel structure, in combination, a member adapted to receive the forward end of a semi-trailer thereon, means adapted to be fixed with respect to a tractor, and means interconnecting said member with the first-mentioned means including means forming a pivotal connection therebetween for pivotal movement of said member about a horizontally extending line transverse to the longitudinal center line of said member and means affording bodily shiftable movement of said member transversely of the longitudinal center line thereof relative to said first-mentioned means, said last-mentioned means comprising links disposed on opposite sides of the longitudinal center line of said member and pivotally mounted at their opposite ends for movement about parallel axes and transmitting the weight of said trailer from said member to said first-mentioned means by tension therein, lines drawn through the pivotal axes of said links on opposite sides of said center line being inclined in an upward and inward direction with respect to said longitudinal center line.

13. A fifth wheel structure for a tractor trailer comprising, in combination, a supporting plate adapted to receive the forward end of a trailer thereon, bracket means adapted for securement to a tractor, and links pivotally supported at their upper ends by said bracket means on opposite sides of the longitudinal center line of the first-mentioned member for pivotal movement in a direction transverse to said longitudinal center line, the lower ends of said links being pivotally connected to said member.

14. A tractor semi-trailer fifth wheel structure comprising, in combination, a member adapted to receive the forward end of a semi-trailer thereon, bracket means adapted for securement to a tractor, a plurality of links arranged on opposite sides of the longitudinal center line of said member and pivotally connected thereto for movement about axes arranged in approximate parallelism with said longitudinal center line, and means forming a pivotal connection between the opposite ends of said links and said bracket means for movement about axes parallel to and located vertically above the first-mentioned pivotal axes.

15. A tractor trailer fifth wheel structure comprising, in combination, a member adapted to receive the forward end of the trailer thereon, bracket means adapted for securement to a tractor, additional bracket means pivotally supported by the first-mentioned bracket means for pivotal movement about an approximately horizontal line extending transversely with respect to the longitudinal center line of the first-mentioned member, and links arranged at opposite sides of the first-mentioned member for pivotal movement about parallel axes arranged in generally parallel relation with respect to said longitudinal center line interconnecting said member and said additional bracket means.

16. A tractor semi-trailer fifth wheel structure comprising, in combination, a plate-like member adapted to receive the forward end of a semi-trailer thereon, bracket means adapted for securement to a tractor and disposed generally below said member, arms fixed to said member on opposite sides of the longitudinal center line thereof and extending downwardly therefrom to a point below the upper ends of said bracket means, and links pivotally connected at one end to the lower ends of said arms for pivotal movement about axes parallel to the longitudinal axis of said member, said links extending upwardly from said pivotal axes, and means pivotally connecting the upper ends of said arms to said bracket means for pivotal movement about axes parallel to said longitudinal axis.

17. A fifth wheel structure for a tractor semi-trailer comprising, in combination, a supporting plate adapted to receive the forward end of a semi-trailer thereon, bracket means adapted for securement to a tractor, and links pivotally supported at their upper ends by said bracket means on opposite sides of the longitudinal center line of the first-mentioned member for pivotal movement in a direction transverse to said longitudinal center line, the lower ends of said links being pivotally connected to said member, at least one of said pivotal connections of said links including resilient means tending to urge said links toward a predetermined position with respect to its connected parts.

18. A fifth wheel structure for a tractor semi-trailer comprising, in combination, a supporting plate adapted to receive the forward end of a semi-trailer thereon, bracket means adapted for securement to a tractor, links pivotally supported at one of their ends by said bracket means on opposite sides of the longitudinal center line of the first-mentioned member for pivotal movement in a direction transverse to said longitudinal center line, the opposite ends of said links being pivotally connected to said member, and yieldable means cooperating between said links and members tending to resist relative pivotal movement thereof.

19. A fifth wheel structure for a tractor semi-trailer comprising, in combination, a supporting plate adapted to receive the forward end of a semi-trailer thereon, bracket means adapted for securement to a tractor, links pivotally supported at their upper ends by said bracket means on opposite sides of the longitudinal center line of the first-mentioned member for pivotal movement in a direction transverse to said longitudinal center line, the lower ends of said links being pivotally connected to said member, and resilient means cooperating between said links and said arms constantly urging said links toward a predetermined pivotal relation with respect to said arms.

20. In a tractor semi-trailer fifth wheel structure, in combination, a member adapted to receive the weight of the forward end of the semi-trailer thereon, bracket means disposed generally below said member and adapted for securement to a tractor, horizontally disposed pivot means extending transversely with respect to the longitudinal center line of said member adjacent the upper limit of said bracket means, secondary bracket means pivotally mounted on said pivot means on opposite sides of the longitudinal center line of said member, secondary pivot means extending longitudinally of said member carried by said secondary bracket means, links mounted for pivotal movement about the axes of said secondary pivot means and extending downwardly therefrom, arms fixed to said member and projecting downwardly therefrom, and means pivotally connecting the lower ends of said arms to the lower ends of said links for movement about axes parallel to the axes of said secondary pivot means.

21. In a tractor semi-trailer fifth wheel structure, in combination, a member adapted to receive the weight of the forward end of the semi-trailer thereon, bracket means disposed generally below said member and adapted to securement to a tractor, horizontally disposed pivot means extending transversely with respect to the longitudinal center line of said member adjacent the upper limit of said bracket means, secondary bracket means pivotally mounted on said pivot means on opposite sides of the longitudinal center line of said member, secondary pivot means extending longitudinally of said member carried by said secondary bracket means, links mounted for pivotal movement about the axes of said secondary pivot means and extending downwardly therefrom, arms fixed to said member and projecting downwardly therefrom, means pivotally connecting the lower ends of said arms to the lower ends of said links for movement about axes parallel to the axes of said secondary pivot means, and resilient means cooperating between said links and said arms yieldingly resisting pivotal movement of said links with respect to said arms.

22. In a tractor semi-trailer fifth wheel structure, in combination, a member adapted to receive the weight of the forward end of the semi-trailer thereon, bracket means disposed generally below said member and adapted for securement to a tractor, horizontally disposed pivot means extending transversely with respect to the longitudinal center line of said member adjacent the upper limit of said bracket means, secondary bracket means pivotally mounted on said pivot means on opposite sides of the longitudinal center line of said member, secondary pivot means extending longitudinally of said member carried by said secondary bracket means, links mounted for pivotal movement about the axes of said secondary pivot means and extending downwardly therefrom, arms fixed to said member and projecting downwardly therefrom, means pivotally connecting the lower ends of said arms to the lower ends of said links for movement about axes parallel to the axes of said secondary pivot means, the last-mentioned means including pins fixed with respect to said arms, and rubber-like elements interconnecting said pins and links yielding resisting relative rotation of said links with respect to said pins.

23. In a tractor semi-trailer fifth wheel structure, in combination, a pair of transversely spaced brackets adapted for securement to a tractor, a transverse pivot pin carried by the upper end of each of said brackets, the axes of said pivot pins being aligned, additional bracket means carried by each of said pivot pins for pivotal movement about the axis thereof, a pivot pin carried by each of said additional brackets and arranged with its axis perpendicular to the axes of the first-mentioned pivot pins, a pair of links mounted on each of the second-mentioned pivot pins for pivotal movement about the axes thereof and extending downwardly therefrom, a member adapted to receive the load of the forward end of a semi-trailer thereon arranged generally above said brackets, arms fixed to said members and projecting downwardly therefrom, and pivot pins parallel with the second-mentioned pivot pins interconnecting said arms and the lower ends of said links.

24. In a tractor semi-trailer fifth wheel structure, in combination, a pair of transversely spaced brackets adapted for securement to a tractor, a transverse pivot pin carried by the upper end of each of said brackets, the axes of said pivot pins being aligned, additional bracket means carried by each of said pivot pins for pivotal movement about the axis thereof, a pivot pin carried by each of said additional brackets and arranged with its axis perpendicular to the axes of the first-mentioned pivot pins, a pair of links mounted on each of the second-mentioned pivot pins for pivotal movement about the axes thereof and extending downwardly therefrom, a member adapted to receive the load of the forward end of a semi-trailer thereon arranged generally above said brackets, arms fixed to said members and projecting downwardly therefrom, pivot pins parallel with the second-mentioned pivot pins pivotally interconnecting said arms and the lower ends of said links, and bushings of rubber-like material interconnecting the last-mentioned pivot pins and said links.

FREDERICK M. REID.